(12) United States Patent
Parkinson et al.

(10) Patent No.: US 8,899,893 B2
(45) Date of Patent: Dec. 2, 2014

(54) CARGO AIRCRAFT RAIL SYSTEM

(71) Applicant: Capewell Components Company LLC, South Windsor, CT (US)

(72) Inventors: Stephen T. Parkinson, Suffield, CT (US); Adam J. Fitzgerald, East Hartford, CT (US)

(73) Assignee: Capewell Components Company, LLC, South Windsor, CT (US)

(*) Notice: Subject to any disclaimer, the term of this patent is extended or adjusted under 35 U.S.C. 154(b) by 0 days.

(21) Appl. No.: 14/202,053

(22) Filed: Mar. 10, 2014

(65) Prior Publication Data

US 2014/0271023 A1    Sep. 18, 2014

Related U.S. Application Data

(60) Provisional application No. 61/782,152, filed on Mar. 14, 2013.

(51) Int. Cl.
*B60P 7/08* (2006.01)
*B60P 7/15* (2006.01)
*B64D 9/00* (2006.01)

(52) U.S. Cl.
CPC .. *B64D 9/003* (2013.01); *B60P 7/15* (2013.01)
USPC .............................................. 410/80; 410/77

(58) Field of Classification Search
USPC ........... 410/69, 77, 78, 80, 92, 94; 244/118.1, 244/137.1; 248/503
See application file for complete search history.

(56) References Cited

U.S. PATENT DOCUMENTS 8,403,606 B2 *  3/2013   Allert et al. ..................... 410/80

* cited by examiner

*Primary Examiner* — Stephen Gordon
(74) *Attorney, Agent, or Firm* — Alix, Yale & Ristas, LLP

(57) ABSTRACT

A rail system for retaining cargo payload has a longitudinal inboard rail and an opposing longitudinal outboard rail. The inboard rail has a recess extending longitudinally for sliding receipt of a lip on a payload. A latch plate extends at least partially into the recess for engagement with the payload. The latch plate is pivotable from an engaged position retaining the payload in a fore-and-aft position to a disengaged position releasing the fore-and-aft retention optionally by a lever system.

8 Claims, 6 Drawing Sheets

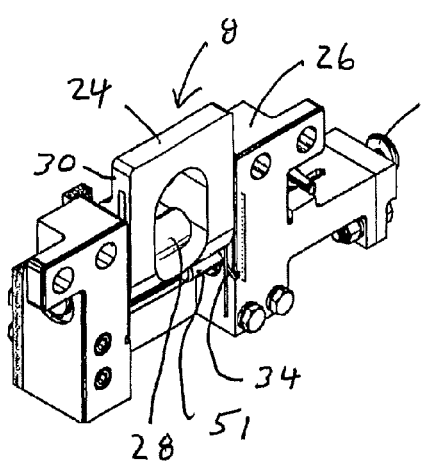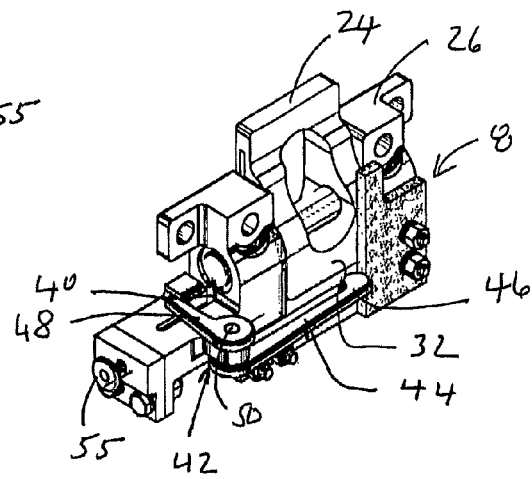
Fig. 3A  Fig. 3B
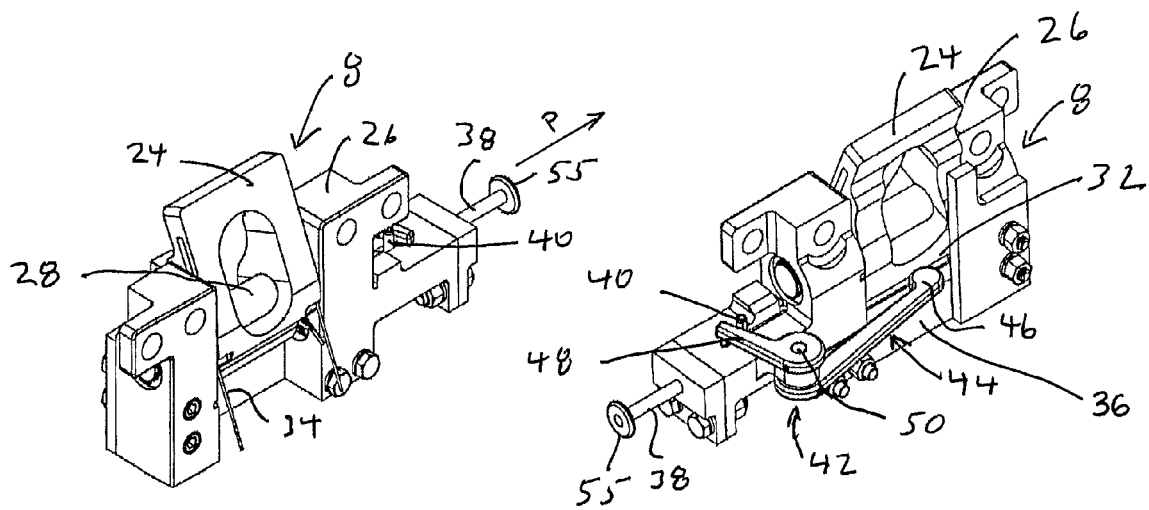
Fig. 3C  Fig. 3D

CARGO AIRCRAFT RAIL SYSTEM

BACKGROUND

The present disclosure relates to a system for retaining pallets and/or platforms in a cargo aircraft using a simple rail system.

Various mechanical and electrical latching and rail X latch systems for Military cargo aircraft presently exist. These systems have become increasingly complex to increase aerial delivery safety and give the load master computerized management. Systems have therefore become integrated into and unique to the parent aircraft. The system disclosed herein is for air transport and reintroduces a modular design concept, with the economic use of standard tension latches and simple operating systems.

BRIEF DESCRIPTION OF THE DRAWINGS

FIG. 3A is an isometric view of the right side of the latch showing the latch in the engaged position;

FIG. 3B is an isometric view of the left side of the latch showing the latch in the engaged position;

FIG. 3C is an isometric view of right side of the latch showing the latch in the released position;

FIG. 3D is an isometric view of left side of the latch showing the latch in the released position;

DETAILED DESCRIPTION

Figure 6:
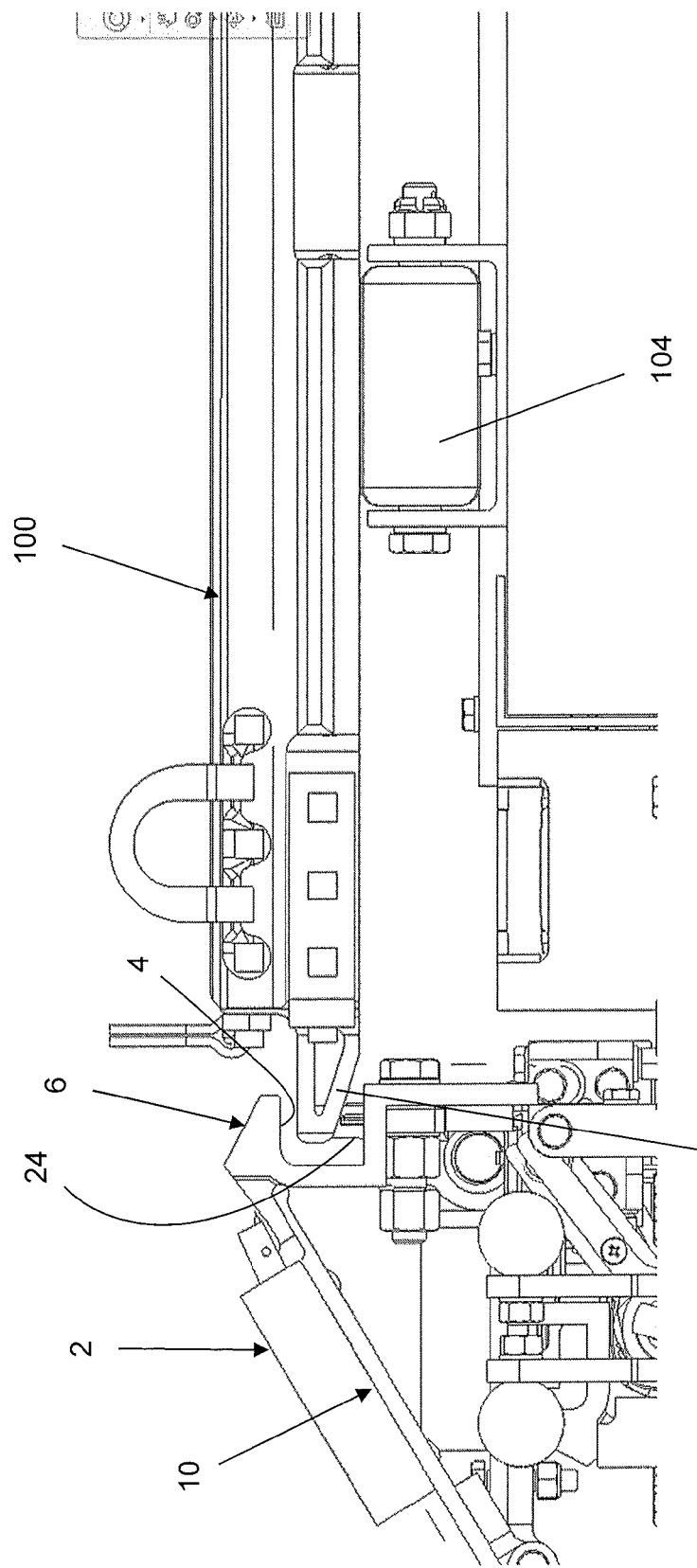
FIG. 6 is a side elevation view of the rail system with a representative payload engaged and maintained.

The cargo aircraft air system as described herein is used for retaining conventional pallets and platforms (i.e., "payload") 100. The aircraft floor is configured with two opposite handed rail systems 2 laterally spaced from each other with respective longitudinal recesses facing each other. Preferably the opposite rail systems 2 are separated by approximately between 90-120 inches, and more preferably by approximately 100-112 inches. In a particularly preferred embodiment, the opposing rail systems 2 are positioned approximately 108 inches apart. Lines of rollers (for example, like that depicted as reference numeral 104 in FIG. 6) on the floor of the aircraft support the payload vertically and allow the payload to move forward and rearward. Lips 102 on the outer edges of the payload slide within the recess 4 in the inboard rail 6 of the rail system 2. While not shown in the drawings, the opposite edge of the payload is configured with a similar lip for sliding receipt by a recess on the opposing rail system. The opposing rail systems 2 are ideally positioned with respective recesses 4 extending rearward parallel to each other to allow the payload to be slid into engagement and thereafter maintained in a generally flat position.

Figure 1:
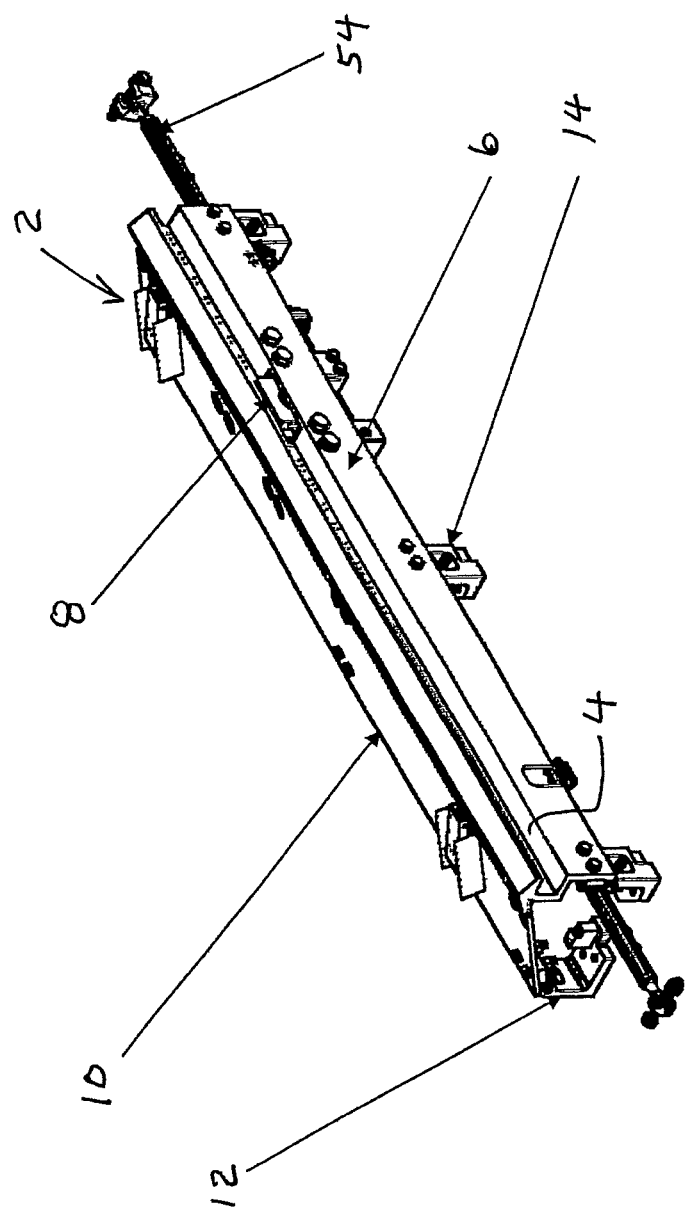
FIG. 1 is an isometric view of a portion of length of the rail system showing the rail system up with the latch in the engaged position.
Figure 2:
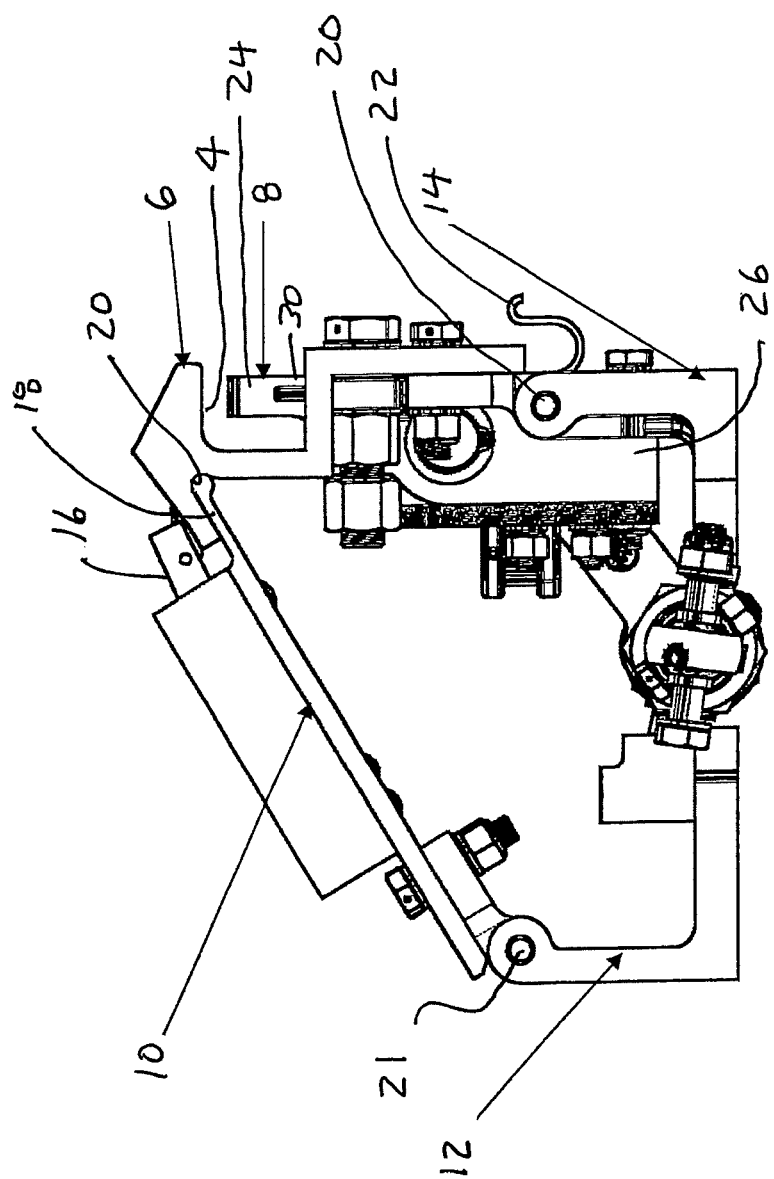
FIG. 2 is a cross sectional view of the rail system of FIG. 1 showing the rail system up and the latch in the engaged position.

FIGS. 1 and 2 show the rail system 2 in its upright position with the payload latch 8 in its engaged position. As shown, the rail system 2 includes a longitudinally extending outboard rail 10 pivotally connected to an outboard hinge 12. An opposite longitudinally extending inboard rail 6 is likewise connected to an inboard hinge 14. The inboard rail 6 includes the recess 4 extending rearward from the front end along at least a portion of its length facing away from the outboard rail 10. Lips on the payload (FIG. 6, reference numeral 102) may slide within this recess 4 in the rearward or frontward direction.

When the rail system 2 is in its upright position as shown in FIGS. 1 and 2, the rails 6 and 10 are held in their respective positions by tension latches 16 that hold a lip 18 of the outboard rail 10 in a mating groove 20 in the inbound rail 6. The latches may be any commercial latch as known in the field, or may be replaced with another suitable releasable connection element. The rails 6 and 10 may be lowered into their flat or stowed position shown in FIGS. 5A and 5B by opening or releasing the latches 16, folding the rails 6 and 10 downward about their hinge pins 20 and 21 and re-engaging the latches 16 with a hook 22 or similar retention member disposed on the inboard hinge to lock the rails in their respective stowed positions. In the embodiment shown in FIGS. 5A and 5B, the latches 16 and associated instrumentality are positioned above the flat floor, though they may alternatively be positioned within the floor profile.

The inboard latch 8 includes a latch plate 24 extending into the recess 4 in the inboard rail 6 to engage with predetermined slots in the payload lip 102 to provide fore-and-aft locking of the payload, when engaged.

An embodiment of the latch 8 is shown in FIGS. 3A-3D and includes a yoke shaped body 26 mounted on the inside of the inboard rail 6. The latch plate 24 is pivotally mounted in the yoke of the body 26 for pivotal movement about a pivot pin 28. The latch plate 24 includes an upper portion 30 extending above the pivot pin 28 into the recess of the inboard rail 6 for engagement with the payload, and a lower portion 32 extending below the pivot pin 28. The upper portion 30 is pivotable from its engagement position as shown in FIGS. 3A and 3B in the relative direction toward the outboard rail (i.e., counterclockwise as view in FIG. 2), into its disengaged position, as shown in FIGS. 3C and 3D. A spring 34 or similar bias member biases the latch plate 24 into its engagement position shown in FIGS. 3A and 3B. The bottom portion 32 of the latch plate 24 may abut a stop plate 36 to assist in maintaining the latch plate 24 in the engaged position in its "rest state" without lever pressure.

A rod 38 is slidably mounted in the body 26 and extends substantially parallel to the length of the rails 6 and 10. A pin 40 extends substantially perpendicularly from the rod 38 upright through the body 26 in a position to engage a lever system 42. The lever system 42 is configured to actuate the latch plate 24 from its engaged position into its disengaged position. The lever system 42 includes a lever member 44 having an inner arm 46 and an outer arm 48. The inner arm 46 is adapted to contact and engage the bottom lower portion 32 of the latch plate 24 to move it to the disengaged position. The outer arm 48 is adapted to be engaged by the pin 40 on the rod 38 so that the outer arm 48 is pulled outwardly by the pin when the rod 38 is pulled out (see reference letter P in FIG. 3C). The outward movement of the outer arm 48 causes the lever member 44 to rotate about its pivot pin 50 and pivot the inner arm 46 against the lower portion 32 of the latch plate 24, thereby rotating the latch plate 24 about its pivot pin 28 into its disengaged position. The spring 34 biases the latch plate 24 and the lever member toward their engaged positions, and thus returns them to the engaged position when the rod 38 is released.

As can be seen in FIG. 3A, in the rest state with the latch plate 24 in the engaged position, a retractable locking pin 51 (anti-"g" pin) longitudinally protrudes adjacent at least a portion of the lower portion 32 on the inboard side. The locking pin 51 acts as a stop to prevent inadvertent pivoting of the latch plate 24 to the disengaged position under potential shock load or similar forces—i.e., to lock the latch plate in place. When the rod 38 is pulled out, it initially longitudinally retracts the locking pin 51 to open a path for the lower portion 32 to pivot in the inboard direction prior to initiating the lever system 42. When the rod 38 is released and retracts, it allows the locking pin 51 to return to its rest state protruding adjacent to the latch plate lower portion 32, thereby locking the latch plate 24 in the engaged position again.

Figure 4:
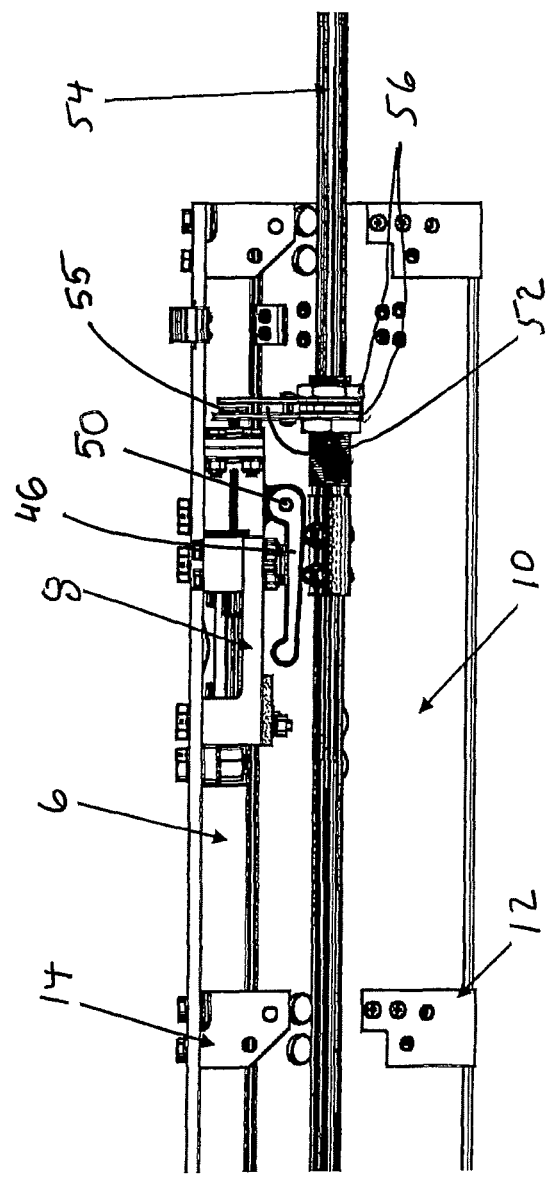
FIG. 4 is a view from underneath the rail system of FIG. 1 showing the latch operation.

Referring to FIG. 4, in this embodiment each latch 8 is operated by a control arm link 52 connected to a common control rod 54. As shown, the control rod 54 extends longitudinally and is positioned laterally between the inboard rail 6 and the outboard rail 10. The control arm link 52 extends substantially perpendicularly from the control rod 54 from a first end connected to the control rod 54 and to a second end connected to the button 55 on the end of the rod 38 in the body 26 of the latch 8. Adjustment nuts 56 may be provided for adjustment to allow all the latches function together.

Preferably, there is one control rod 54 for each side of the aircraft (i.e., one rod per opposite system 2). In one embodiment, the control rods 54 are operated by a mechanical lever with lockout pins to ensure the latch array is in the locked or unlocked position.

Figure 5A:
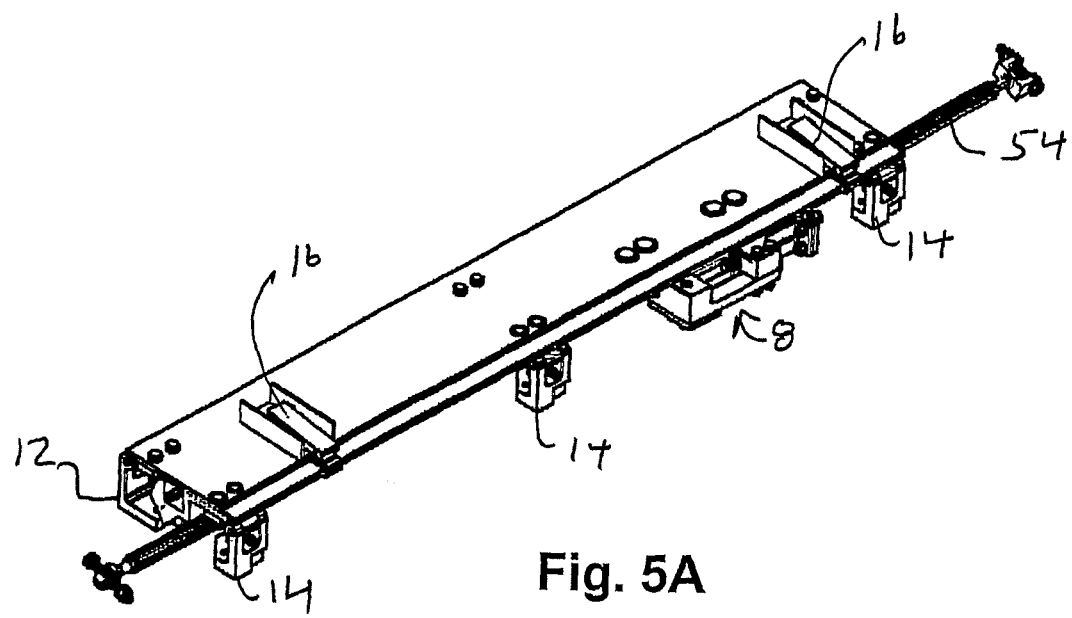
FIG. 5A is an isometric view of a portion of length of the rail system showing the rail system in its flat position.
Figure 5B:
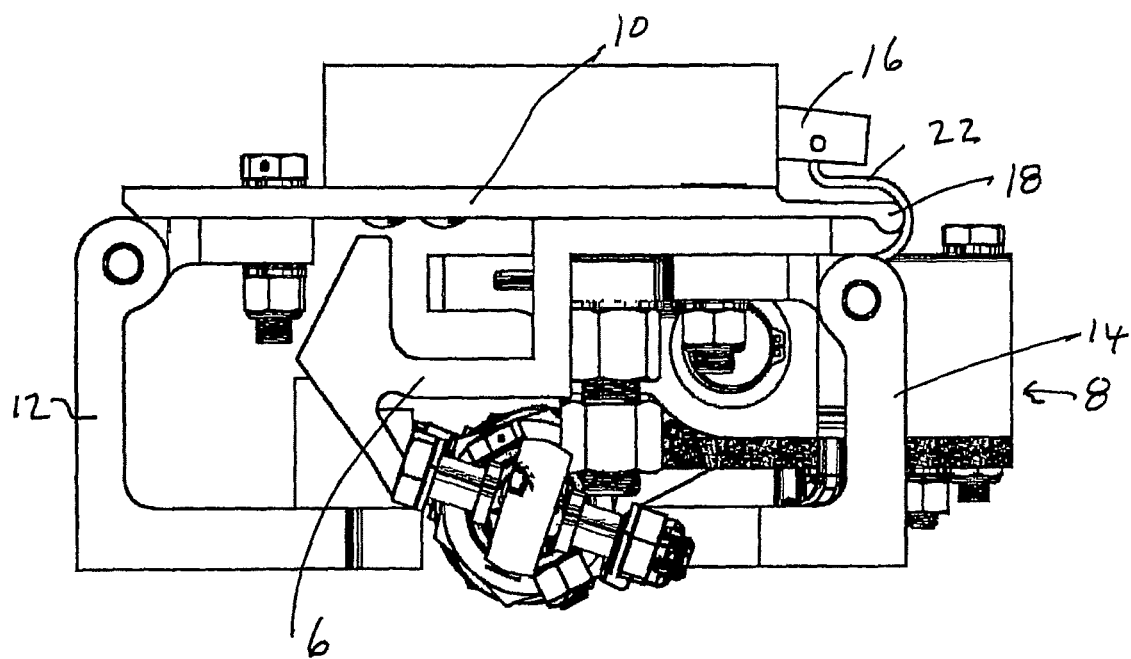
FIG. 5B is a cross sectional view of the rail system in the position shown in FIG. 5A.

As shown in FIGS. 5A and 5B, the rail system 2 can be folded flat for wheeled cargo. The disclosed system 2 includes equipment of minimal depth, thereby providing a substantial advantage over known systems. This feature allows conventional drip trays to be used without individual sinks for deep latches.

The disclosed system 2 provides a modular design that can be used in any new military transport project. The cargo rail system 2 retains designated pallets/platforms in a military cargo aircraft using a simple rail system for both vertical and lateral restraint. The mechanical latches provide fore-and-aft restraint, while tension latches retain the rails in an upright working position and stowed position. Unlike other modern systems presently in use, electrical commands or signaling is not required. Simple mechanical components provided in the disclosed system substantially increase safety and reliability, while reducing cost.

While a preferred embodiment has been set forth for purposes of illustration, the foregoing description should not be deemed a limitation of the invention herein. Accordingly, various modifications, adaptations and alternatives may occur to one skilled in the art without departing from the spirit of the invention and scope of the claimed coverage.

The invention claimed is:

1. A cargo rail system for a payload comprising at least one rail unit with
   an inboard rail extending longitudinally from a front end to a rear end and having a longitudinally extending recess therein for slidably receiving a lip on a payload;
   an outboard rail spaced from said inboard rail, said inboard and outboard rails being pivotally attached to inboard and outboard hinges respectively for movement between an upright position and a flat position;
   at least one latch mounted on said inboard rail and having a latch plate extending into said recess for engagement with said payload, said latch being pivotally mounted for movement between an engaged position retaining said payload via mechanical forces and a disengaged position releasing said payload; and
   at least one latch mechanism configured to hold said rails in their respective upright positions and respective flat positions.

2. The cargo rail system of claim 1, wherein the latch plate retains said payload in a fore-and-aft position in the engaged position and releases the fore-and-aft retention of said payload when moved to the disengaged position.

3. The cargo rail system of claim 1, wherein said latch plate is spring biased into its engaged position.

4. The cargo rail system of claim 1, wherein the latch is pivotable about a longitudinal axis.

5. The cargo rail system of claim 4, wherein the latch plate extends substantially perpendicularly into the recess in the engaged position.

6. The cargo rail system of claim 5, wherein the latch plate pivots in the direction toward the outboard rail when moving to the disengaged position.

7. The cargo rail system of claim 1, comprising a second rail unit of substantially the same design and laterally spaced from the at least one rail unit with the respective longitudinal recesses facing each other.

8. The cargo rail system of claim 1, comprising a lever system for moving said latch plate from said engaged position to said disengaged position.

* * * * *